UNITED STATES PATENT OFFICE.

HORACE H. HUTCHINS, OF MAQUOKETA, IOWA.

ROOFING COMPOUND.

SPECIFICATION forming part of Letters Patent No. 270,436, dated January 9, 1883.

Application filed May 22, 1882. (No specimens.)

*To all whom it may concern:*

Be it known that I, HORACE H. HUTCHINS, of Maquoketa, in the county of Jackson and State of Iowa, have invented certain new and useful Improvements in Roofing Compounds; and I do hereby declare that the following is a full, clear, and exact description of the invention, which will enable others skilled in the art to which it appertains to make and use the same.

My compound or composition consists of the following ingredients, combined in about the proportion stated, viz: coal-tar, one barrel; boiled linseed-oil, ten gallons; turpentine, six gallons; rosin, (pulverized,) ten pounds; sugar of lead, three pounds; plaster-of-paris, two pounds; litharge, three pounds. I first mix the oil and turpentine, stirring it well, so as to thoroughly "cut" the oil. I then add the dry ingredients, and lastly add the coal-tar, the whole being stirred well to mix it thoroughly, when it is ready for use.

In using the above-named composition, dry iron paint is added in suitable proportions during the process of coating or painting the roof, and other pigments may be added, if desired. By the use of this composition leaky seams can easily be stopped. It does not blister in the sun and is affected neither by heat or cold.

I am aware that roofing compositions containing coal-tar, linseed-oil, and litharge have been used before; and I am also aware that some of the other ingredients have been used separately in other compounds used for the same purpose; but I am not aware that all of the ingredients of my composition in the proportions stated have been used together.

I am aware that a roofing compound has been made of coal-tar, pulverized rosin, india-rubber cut in turpentine, shellac varnish, asphalt varnish, brown japan, linseed-oil, white lead, mineral paint, yellow ocher, and sugar of lead, and such compound is not sought to be covered in this application.

What I claim, and desire to secure by Letters Patent of the United States, is—

The herein-described roofing compound or composition, consisting of coal-tar, boiled linseed-oil, turpentine, pulverized rosin, sugar of lead, plaster of-paris, and litharge, in the proportions specified.

In testimony that I claim the foregoing as my own I have hereunto affixed my signature in presence of two witnesses.

HORACE H. HUTCHINS.

Witnesses:
J. A. BUCHNER,
B. B. FRASE.